Figure 1:
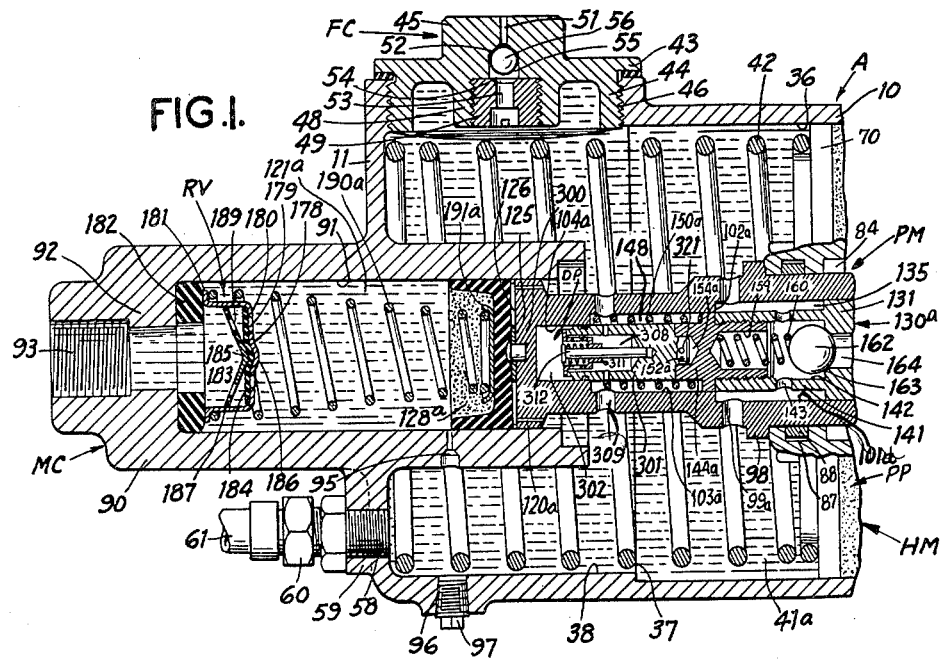

Feb. 9, 1965  G. T. RANDOL  3,168,812
HYDRAULIC THRUST-TRANSMITTING DEVICE
Original Filed March 19, 1958

Inventor ered servomotor or the like such as, for example, a
United States Patent Office 3,168,812
Patented Feb. 9, 1965

3,168,812
HYDRAULIC THRUST-TRANSMITTING DEVICE
Glenn T. Randol, 3 E. 2nd Ave., Loch Lynn,
P.O. Box 275, Mountain Lake Park, Md.
Original application Mar. 19, 1958, Ser. No. 722,425, now
Patent No. 3,046,746, dated July 31, 1962. Divided
and this application July 25, 1962, Ser. No. 212,415
6 Claims. (Cl. 60—54.6)

This application is a division of my copending application Serial No. 722,425 filed March 19, 1958, now issued to Patent 3,046,746 dated July 31, 1962.

The invention relates generally to thrust-transmitting means, and more particularly to a novel hydraulic dashpot device interposed in the thrust line between an operator-operated member such as a brake-pedal, and the power-operated member of a pressure differential operated servomotor or the like such as, for example, a booster-type servomotor on motor vehicles adapted to provide the major portion of the operating force to actuate the master brake cylinder in hydraulic brake systems commonly used on such vehicles.

In my copending application referred to, I have disclosed a novel hydraulically-operated actuator (servomotor) in which reaction transferal to the operator is effected by a smaller reactive piston acted on by the brake-pedal, said smaller piston being coaxially disposed within a larger piston acted on by the power-piston of said servomotor, with both of said pistons operably projecting into the pressure-working chamber of said master cylinder whereby pressure developed on the brake fluid within said working chamber as a function of both pistons, reacts proportionally on the smaller piston to provide resistance to movement of the control valve as a unit with said smaller piston for controlling operation of said servomotor. The art is replete with this type of reaction control to enable the driver (operator) to have instinctively predictable control over the amount of working-pressure in the brake lines therefore the wheel brakes of the vehicle so that the joint force applied by the operator and servomotor can be regulated according to the amount of braking effort required under the conditions, thus avoiding fortuitous over-braking particularly at low vehicular speeds whereat the tendency for the vehicle to "lurch" during braking is difficult to control with booster-assisted servomotors. While this coaxial type of reaction control does provide the driver with awareness of the extent of braking effort in effect at any given position of the brake-pedal, the serious disadvantages of this type of reaction control reside in the problem of sealing both pistons against fluid loss, especially the smaller reactive piston; added production cost to modify the working cylinder in the master cylinder to accommodate said coaxial piston arrangement; and the overall higher cost to produce such a coaxial piston construction, but none has produced a hydraulic dashpot adapted to provide resistance to movement of the brake-pedal and at the same time applying thrust to the work-performing element of the servomotor, in a power-activating direction of movement to initially control the conventional master brake cylinder prior to operative energization of the servomotor, and wherein removal of operator force from the brake-pedal negates the function of the dashpot so that the pedal connected parts in the servomotor retract to their respective normally released positions free of interference from the dashpot for rapid release of the vehicle brakes in synchronism with the rate of relating movement of the brake-pedal. Therefore, there are certain features of construction and use which relate particularly to the hydraulic reactive dashpot per se which render the same applicable to a wide range of booster-type servomotors in operative association with the conventional master brake cylinder and other hydraulic devices, other than the novel combination and arrangement disclosed in my parent application. These features of the hydraulic thrust device form the subject-matter of the present application.

Therefore, the primary object of my invention seeks to overcome the above noted disadvantages by applying my hydraulic thrust control in the form of a dashpot, to the control of servomotors of the type under consideration, to produce an extremely compact unit characterized by releasably blocking brake-pedal movement in a power-activating direction to enable the operator to predictably control operation of such servomotors during power-assist thereby, and use of the conventional master brake cylinder without modifying the same for simplification of the structure and lowering of the cost of such power-assist units.

More specifically, my hydraulic dashpot device comprises a variable volume dashpot chamber incorporated between said larger and smaller coaxial pistons, said dashpot chamber being controlled by a spring-loaded check-valve having restrictive ports therein adapted to release fluid from said chamber in minute quantities when normally seated, in accordance with the pressure effective on the smaller piston during power-activation of the servomotor, said check-valve being operable to overcome its spring load thereby unseating to enable fluid inflow to said dashpot chamber to bypass said restrictive ports for accelerated movement of the smaller piston relative to the larger piston during releasing movement of the brake-pedal to take the vehicle brakes "off."

An object related to the specific object above, is the provision of a static valve chamber coaxially arranged with respect to said dashpot chamber, and wherein said check-valve is interposed to restrict fluid flow when said dashpot chamber is transmitting thrust from the brake-pedal, and to accommodate substantially unrestricted fluid flow between said chambers when said dashpot chamber is being expanded to normal volume capacity in readiness for another releasable blocking of said brake-pedal during operation of the latter to bring about operative energization of said servomotor.

Figure 2:
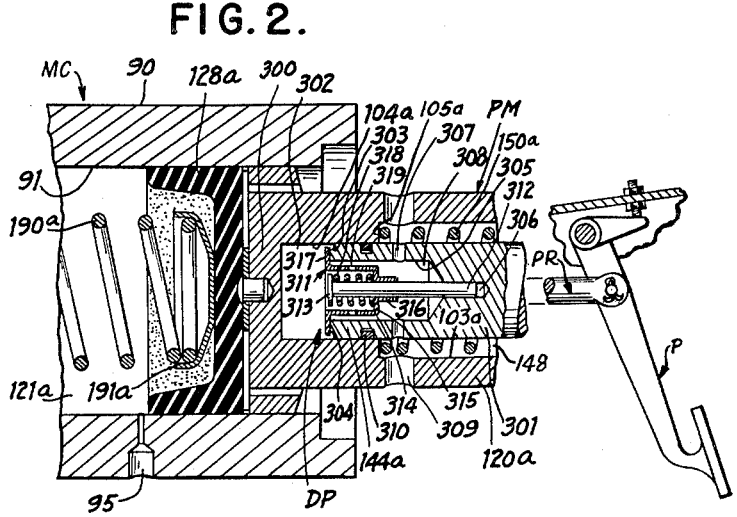
Figure 2:

With these and other objects and advantages in view, the invention consists of the new and novel combination, construction, and arrangement of the parts as hereinafter more fully described, set forth in the claims appended hereto, and disclosed in the accompanying drawing forming part hereof, wherein:

FIGURE 1 is a fragmentary portion of a hydraulically-operated brake servomotor shown in longitudinal vertical section, and which embodies my hydraulic thrust-transmitting device constructed in accordance with the present invention, the parts being shown in their respective normally released positions corresponding to the condition in which the vehicle brakes are "off"; and FIGURE 2 is a fragmentary sectional view taken from FIGURE 1 on an enlarged scale to clarify the particulars of my hydraulic thrust-transmitting device.

Referring now to the drawing, there is shown in FIGURE 2 my novel hydraulic thrust-transmitting device generally designated "DP" embodied in my pressure-producing device generally designated by the reference character "A" and which comprises the hydraulically-operated servomotor "HM" in operative association with the conventional master brake cylinder "MC," reference may be had to my copending parent application for a more comprehensive understanding of these components.

The booster servomotor HM comprises an actuatable member disclosed herein as a power-piston assembly designated "PP" reciprocably mounted in the power cylinder 10, the body portion 70 of the power-piston being adapted to act on an annular shoulder 98 integrally formed with an intermediate portion of a tubular work-performing member "PM." The inner cylindrical surface on the power cylinder 10 is defined by a smooth working surface 36 for said piston 70, and an internal shoulder 37 defining a forward unfinished cylindrical surface 38, said power-piston dividing the interior of the power cylinder 10 into a variable pressure power chamber 40 and a variable volume primary supply chamber 41a, said power-piston being biased toward normally released position as shown in FIGURE 1 by a normally preloaded return spring 42.

A filler cap "FC" is provided for the supply chamber 41a, said cap having an exterior annular flange 43, a reduced diameter externally threaded depending ring flange 44, a coaxial exterior embossment 45 preferably formed with a hexagonal perimeter for reception of a wrench for manual removal and installation of said cap, from an internally complementally threaded opening 46 provided in the wall of the power cylinder into the supply chamber 41a. Centrally depending from flange 43 and concentrically disposed within the flange 44 is another depending ring-like flange 48 internally threaded for reception of an externally threaded hollow plug 49, a coaxially disposed breather passage 51 is provided through the flange 43 and embossment 45 to the exterior, the inner end of said passageway terminating in an annular valve seat 52 of larger diameter, and a coaxial bore 53 through said plug terminates in a conical concavity 55 in which a movable check-valve element such as a steel ball 56, is positioned to cooperate with the valve seat 52 to prevent escape of fluid from the supply chamber 41a should a slightly pressurized condition develop which, if present, would cause the ball to move upwardly and seat tightly thus closing the passageway 51. When the fluid in the supply chamber 41a is under normal non-activating flow condition, the ball drops under influence of gravity, to vent the supply chamber 41a to atmosphere thus avoiding the tendency of the power-piston PP when operating, to create a vacuum condition within said supply chamber.

Accordingly, if the supply chamber 41a becomes filled and fluid therein slightly pressurized, the check-valve 56 in the filler cap FC becomes effective to restrict fluid-surge and therefore prevents fluid loss via the breather passageway 51. A fluid outlet passageway 58 is provided through the end wall 11 for the supply chamber 41a, said outlet passageway extending to the exterior of the power cylinder 10 via an internally threaded boss 59 integral with said end wall which receives a threaded nut and bushing 60 for attaching a fluid return conduit 61 as shown in FIGURE 1.

The master brake cylinder MC includes the cylindrical casing 90 coaxially disposed medially of the end wall 11 of the power cylinder 10 and preferably integral therewith as shown. The casing 90 has a finished inner cylindrical surface 91 and is open at its inner end and closed at its outer end by a wall 92 through which a discharge port 93 is provided. A compensating port 95 is provided through the wall of the casing 90 for maintaining the supply chamber 41a connected to the interior of said casing. A threaded hole 96 through the wall of the power cylinder 10 is fitted with a drain plug 97 which is coaxially positioned with respect to the compensating port 95 to enable processing of this port as by inserting a drill through the hole 96.

A residual pressure check-valve "RV" having a cup-shaped housing 178 with openings 179 provided through its end wall 180, the open end of said housing terminating in an outturned annular flange 181 parallel to the end wall aforesaid, which movably engages a ring-like valve seat 182 engaging the inner side of the end wall 92 of the master cylinder, said check-valve assembly including a self-contained pressure discharge one-way check-valve 183 comprising a flexible disc 184 impinged at its center between cooperating mating portions 185, 186 carried by the partition member 187 which is provided with openings 189, and the end wall 180, respectively. The flexible disc is adapted to control the openings to admit pressurized fluid from the working chamber 121a into the discharge port 93 via the openings 189 to operate the wheel cylinders (not shown) of the vehicle wheel brakes (not shown) as is understood.

The tubular work-performing member PM is ported at 99a to maintain the supply chamber 41a connected to an intermediate portion of the interior of said work member which is provided with a counterbore 101a terminating at its forward end with an internal annular shoulder 102a defining another counterbore 103a merging with the forward axial bore 104a to produce another internal annular shoulder at 105a, said axial bore 104a of the tubular work member PM being closed at its forward end by an end wall 300 to provide a solid piston head on the hydraulic piston 120a whereby the cup seal 128a transmits reaction from the spring 199a via its spring seat 191a to the head end of the work-performing member PM only. Therefore, this spring serves as a piston return spring and control for the residual pressure regulating means since its reaction on piston 145 (see Patent 3,046,746 granted to me July 31, 1962) has been nullified. Slidably mounted in the axial bore 104a is a hydraulic piston 301 with its rear reduced end 152a piloted in the blind hole 154a in the forward end extension 144a on a control valve piston 130a, and the forward end of the piston 301 projects into the bore 104a to provide therewith a hydraulic dashpot generally designated "DP" having a variable working chamber 302 with respect to the end wall 300. Longitudinally spaced from the forward end of the piston 301 is an annular outstanding flange 147 slidably mounted in said counterbore 103a, said flange cooperating with shoulder 105 to produce a variable volume fluid supply chamber 148 hereinafter referred to as a "secondary supply chamber."

The head end of the piston 301 is provided with a peripheral offset at 303 to provide an annular valve seat 304, and a longitudinal counterbore 305 merges with a blind smaller coaxial bore 306 to produce a static valve chamber 308, and a plurality of passageways 307 extends through the wall of the counterbore 305 to maintain fluid communication between said secondary supply chamber and said valve chamber 308 longitudinally spaced rearwardly of the head end of said piston, and another passageway 309 is provided through the wall of the counterbore 103a for maintaining the secondary supply chamber aforesaid in communication with the primary supply chamber 41a. A piston ring 310 is provided in an annular groove intermediate the head end and valve chamber 308 of said piston 301 to effect a fluid-tight seal with respect to said bore 104a whereby the dashpot chamber 302 receives and discharges the fluid under control of check-valve means comprising a cup-shaped valve element 311 slidably mounted on a support stem 312 provided with a forward annular flanged end 313, and the rearward normal diameter portion being pressfitted into the bore 306 for movement as a unit with the piston 301, said movable check-valve element 311 having a cylindrical body portion 314 closed at its rear end by a wall 315 centrally apertured at 316 through which said support stem 312 projects and the forward open end of said body portion terminates in an outturned annular flange 317 in parallel relationship to the end wall thereof to overlie the aforesaid annular valve seat 304 and cooperate therewith under influence of a normally preloaded light compression spring 318 operably disposed within the body portion in encircling relation with respect to the forward portion of the support stem, between the flange 313 and end wall 315. The wall of the body portion 314 is provided with a metering control port 319. A cross pin 321 through the piloted end of said piston 301 couples the latter to the control valve piston 130a for axially movement as a unit.

In operation, initial operator pressure applied to another actuatable member disclosed herein as the conventional pivotally suspended pedal P is transmitted to the control valve piston 130a via a push-rod PR. Resistance provided by the trapped fluid in the dashpot chamber 302 due to restriction to outflow by the metering port 319 back into the supply chamber 41a via the valve chamber 308, passageways 307, 309, prevents premature relative movement of the control valve piston 130a with respect to the hydraulic working member PM to induce operation of the booster motor HM, such resistance being supplemented by the preloaded reaction from the valve return spring 150a. In this way, initial pedal depression is effective particularly when rapidly executed to move the work-performing member PM substantially as a unit therewith relatively to the power-piston assembly PP to take up the slack in the brake system thus placing the brake shoes in light contact with their respective wheel drums and thereby subject said work element to a workload resistance opposing pedal-actuation thereof. With increasing pressure applied to the pedal (not shown) at this point of the braking operation, the dashpot DP continues to cooperate with the spring 150a to pressurize the fluid in the working chamber 121a of the master cylinder MC therefore the associated brake system sufficiently to substantially halt movement of the work member PM thus inducing relative pedal movement with consequent yielding of the spring 150a without interrupting a progressively diminishing resistance from the pressurized condition of the fluid in the dashpot chamber 302. At this stage of initial braking application, the operator is apprised of the inauguration of the power phase since the dashpot DP and spring 150a are reacting to oppose pedal movement in such manner that if pedal movement is moderately rated, the mergence of the power phase with such initial operator movement is smoothly accomplished, but if the operator imparts a rather rapid or erratic initial movement to the pedal, the dashpot comes into play to momentarily block said relative movement of the control valve piston 130a with respect to said hydraulic working member PM irrespective of the preloaded weight of the valve return spring 150a, to prevent a sudden initial energization of the hydraulic servomotor HM with consequent "grabbing" or "locking" of the wheel brakes (not shown). Under these circumstances, the operator merely converts pedal movement into pressurizing the fluid in the working chamber 121a and therefore, effects initial brake application in proportion to the speed of pedal movement until the dashpot chamber 302 can discharge its trapped fluid via the metering port 319, valve chamber 308, and passageways 307, 309 back into the supply chamber 41a; but, if the operator gives the pedal a more slowed normal rate of initial movement, the metering port 319 enables the trapped liquid in the dashpot chamber 302 to discharge substantially in proportion to pedal movement displacement thereof so that unitary movement of the control valve element 130a with the pedal will effect interruption of the fluid circulating system to energize the hydraulic power-piston 70 in a gradually increasing rate of movement to smoothly blend the power phase with initial operator phase thereby producing a smooth braking application through the full range of pedal movement. By virtue of the "blocking" function provided by the dashpot DP, fortuitous energization of the hydraulic servomotor HM is avoided, and a light valve return spring 150a may therefore be used to render the present brake-booster apparatus A highly suitable for low-pedal control so that the operator may use a swinging movement of the foot from the heel engaging the floor in the driver's compartment, between the accelerator and brake pedals substantially in the same plane when in normal released positions. By using the toe portion of the foot, improved control action is provided with reduced effort, and safety of operation of the vehicle is enhanced as well by some reduction in the time required to apply pressure on the brake-pedal.

When pressure is removed from the pedal to take the brakes "off," valve piston return spring 150a alone biases the control valve piston 130a toward its normally released position as shown in FIGURE 1, and this releasing operation is rapid to effect quick release of the brakes since the dashpot chamber 302 is refilled via the valve flange 317 unseated from its seat 304 which enables a much larger volume of fluid to re-enter the chamber 302 than that capable of being discharged through the metering port 319 during a brake-applying movement of the dashpot piston 301. A vacuum condition temporarily created in the dashpot chamber 302 unseats the valve element 311 against the force of its seating spring 318 to draw the fluid from the supply chamber 41a via the secondary supply and valve chambers 148, 308 respectively, in such volume so as to progressively refill the dashpot chamber 302 as it enlarges to normal size shown in FIGURES 1 and 2 without restricting pedal movement as foot pressure is removed from the pedal therefore the control valve 130a and dashpot piston 301. Therefore, the valve return spring 150a effects withdrawal of the control valve piston 130a to its normal open position as shown in FIGURE 1, the spring being of such strength so as to move the valve element 130a in unison with the release of the pedal, and the open condition of the check-valve 311 enables ingress of fluid from the supply chamber 41a into the dashpot chamber 302 to bypass the metering port 319 so that the suction of the piston 301 induced by the valve return spring 150a progressively refills chamber 302 as rapidly as the pedal is released to take the brakes "off."

Accordingly, it is seen from the foregoing description of this hydraulic dashpot device, that the dashpot arangement serves a twofold purpose of transmitting operator force to initially apply the brakes if the speed of pedal movement is excessive, and a lighter valve return spring may be combined with the dashpot action to provide a lighter pedal operation favoring a low-pedal mechanismn in which less mechanical advantage is provided over a normal height pedal.

Thus when initial operator force is applied as, for example, to the brake-pedal, P, the piston 301 is moved substantially in unison with the control valve piston 103a, whereupon reduction in the size of the dashpot chamber 302 ensues as a result of fluid displacement therefrom through the metering port 319 into said secondary chamber 308 and thence via the passageways 307, 309 back into the primary supply chamber 41a. This slowed reduction in the size of said dashpot chamber 302 produces a progressively diminishing resistance to movement of the brake-pedal and connected control valve piston 130a relative to the work member PM, to induce operative energization of the booster motor HM and at the same time provide the operator with physical awareness of the amount of working pressure in effect for a given position of the brake-pedal. Upon release of the brake-pedal, the piston 301 retracts accordingly under influence of its return spring 150a, which enables the check-valve to move against its spring load to unseat, thereby enabling the dashpot chamber 302 to fill rapidly with little or no resistance to return pedal movement. During this normalizing of the size of the dashpot chamber a partial vacuum condition may obtain which augments the inflow of fluid from the valve chamber 308 to said dashpot chamber 302 so that retraction of the piston 301 is unimpeded during releasing movement of the brake-pedal, but when the pedal is depressed to apply the vehicle brakes, movement of the piston 301 is gradual due to seat condition of the check-valve 311 wherein transfer to fluid from the dashpot chamber to said valve chamber 308 is by way of the metering port 319.

Pumping of the brake-pedal to preventing "fade" due to excessive heating of the brake drums, is especially aided by my novel hydraulic dashpot device DP since the brake-pedal can be pulsated by the foot of the operator such that releasing movement is substantially unresisted, while depressing movement to apply the brakes is opposed at any station of the pedal through its full operating stroke to provide predictable control over the total braking effort without such opposition, the operator would invariably apply too much pressure to the pedal thus rendering the brake applications over-sensitive therefore difficult to control.

In view of the foregoing description augmented by the drawing, it should be evident that my invention discloses a novel hydraulic thrust-transmitting device having special use in pressure differential operated servomotors adapted to provide the major portion of the operating force to actuate the vehicle brakes, and that the structure is simple in design and arrangement, and which is adapted to successfully achieve its objectives.

Whereas, the drawing illustrates, and the description sets forth the preferred embodiment of my invention, it should be understood that the invention contemplates any variations of structure, and equivalents or modifications which may fall within the scope of the subjoined claims.

Having thus described my invention, I claim:

1. In a hydraulic thrust-transmitting device having a fluid supply chamber, and adapted for use in cooperation with a hollow member activatable to perform work in a thrust-transmitting direction and which is closed at one end and open at the other, said member being activatable under influence of a pair of cooperable actuatable members, with one of said pair of members being adapted to control the other member, the improvement which comprises: a piston reciprocable in the hollow of said work member under influence of said one of said pair of members; a variable volume hydraulic dashpot chamber provided between the closed end of said work member and confronting end of said piston; a valve chamber incorporated in the confronting end of said piston, and provided with an open end communicating with said dashpot chamber, and a closed end; fluid passageway means between said supply and valve chambers; valve means including an element movably mounted on the confronting end of said piston and biased thereagainst under spring-action to control fluid flow between said dashpot and valve chambers aforesaid; a valve seat defining the confronting end of said piston for said valve element to seat against; and a fluid flow metering port through a portion of said valve element interconnecting said dashpot and valve chambers, said port functioning when said valve element is seated during thrust-transmitting activation of said work member, to restrict excursion of fluid from said dashpot chamber into said valve chamber, and thereby enabling substantially unitary movemnet of said piston and work member under initial actuation of said one actuatable member until said work member encounters a resistance to movement of sufficient magnitude to induce relative actuation of said one actuatable member with respect to said work member to control actuation of the other acutatable member whereupon joint actuation of both actuatable members is effective to activate said work member to transmit additional thrust against said resistance.

2. In a hydraulic thrust-transmitting device having a fluid supply chamber, and adapted for use in cooperation with an element movable to perform work, said element being activatable in a thrust-transmitting direction under influence of a pair of cooperable actuatable members, with one of said pair of members being adapted to control the other member, the improvement which comprises: a control element movable initially in unison with said one member and said work element and subsequently relatively to the latter element to control actuation of said other member; fluid thrust-transmitting means including a check-valve therefor movable between restrictive and free flow positions of control and disposed in coaxial relationship with respect to said control element between said latter element and said work element, said thrust-transmitting means functioning in a thrust-transmitting direction to releasably resist relative actuation aforesaid of said one member and said control element as a unit with respect to said work element when said check-valve is in restrictive position during initial actuation of said one member until said work element encounters a predetermined work resistance to movement requiring additional actuation of said one member to overcome said predetermined resistance to enable relative movement aforesaid of said control element; passageway means including interposition of said check-valve to control the same, between said supply chamber and thrust-transmitting means; and a normally preloaded spring operably incorporated between said control element and said check-valve to bias the latter toward restritcive position wherein excursion of fluid flow from said thrust-transmitting means to said supply chamber is releasably blocked.

3. In a hydraulic thrust-transmitting device having a fluid supply chamber, and adapted for use in cooperation with an element movable to perform work, said element activatable in a thrust transmitting direction under influence of a pair of cooperable actuatable members, with one of said pair of members being adapted to control the other member, the improvement which comprises: a control element movable initially in unison with said one member and said work element and subsequently relatively to the latter element to control actuation of the other member; fluid thrust-transmitting means including a check-valve therefor movable between restrictive and free flow positions of control and disposed in coaxial relationship with respect to said control element between said latter element and said work element, said thrust-transmitting means functioning in a thrust-transmitting direction to releasably resist relative actuation aforesaid of said one member and said control element as a unit with respect to said work element when said check-valve is in restrictive position during initial actuation of said one member until said work element encounters a predetermined work resistance to movement capable of inducing relative movement aforesaid of said control element; passageway means including the interposition of said check-valve to control the same, between said supply chamber and thrust-transmitting means; a normally preloaded spring operably incorporated between said control element and said check-valve to bias the latter toward restrictive position wherein excursion of fluid flow from said thrust-transmitting means to said supply chamber is releasably blocked; a fixed abutment; and another normally preloaded spring reacting between said abutment and work element to transmit a progressively increasing reactive force to supplement said work resistance.

4. In a hydraulic thrust-transmitting device for use in cooperation with a tubular work-performing element closed at one end and open at the other, said element being activatable in a thrust-transmitting direction by a pair of cooperable actuatable members, with one of said pair of members being adapted to control the other member, the improvement which comprises: a primary fluid supply chamber; a piston reciprocable in said work element; a variable volume hydraulic dashpot chamber provided between the closed end of said work element and the end of said piston projecting therein; a cylindrically walled valve chamber formed in said piston in coaxial relationship to said dashpot chamber, with one end closed and the open end confronting said dashpot chamber; an annular valve seat terminating the wall of the open end of said valve chamber; check-valve means including a movable element adapted to cooperate with said valve seat under spring action to isolate said valve chamber from said dashpot chamber; a variable volume secondary fluid supply chamber incorporated between said piston and work element in concentric overlapping relationship with respect to said piston; a port in said work element for maintaining fluid communication between said two supply chambers; a port through the wall of said valve chamber for maintaining fluid communication between said valve and secondary supply chambers; a normally preloaded spring reacting between said work element and said piston to establish the latter in normal position wherein said dashpot chamber is normalized and said check-valve element seated under influence of its spring action; means interconnecting said one actuatable member with said piston for movement as a unit in opposition to the bias of said preloaded spring to reduce the size of said dashpot chamber; and a restrictive port in the check-valve element for retarding the rate of fluid flow from the dashpot chamber into said valve chamber to thus produce a dashpot-action for releasably resisting relative movement of said piston with respect to said work element under influence of said one actuatable member, whereby a portion of the initial force transmitted by said latter member is applied to activate said work element substantially in unison therewith until the latter element encounters a predetermined work resistance to movement prior to the other actuatable member becoming operative under control of the one actuatable member actuating relatively to said work element as a function of said work resistance to enable joint activation of said work element by both actuatable members.

5. A hydraulic thrust-transmitting device constructed in accordance with claim 4 in which said check-valve means additionally comprises said movable element formed as a cup-shaped member having a forward outstanding annular flange and a longitudinally spaced rear end wall interconnected by a cylindrical sleeve, said flange normally engaging the aforesaid annular valve seat; a central aperture in the end wall defined by a reduced diameter portion of said sleeve formed by diminishing the normal diameter of the latter; a support rod fixed on said piston and projecting coaxially through said aperture and secondary supply chamber to slidably support said cup-shaped member; an annular head terminating the forward end of said support rod; and a normally preloaded compression spring operably disposed within said cylindrical sleeve in encircling relation to that portion of the support rod normally in circular alignment therewith, to react between said rod head and end wall to produce said spring-action to effect seating of said flange on said annular valve seat thereby rendering said dashpot chamber effective to releasably oppose movement of said piston relative to said work element under influence of said one actuatable member.

6. In a hydraulic thrust-transmitting device adapted for use in cooperation with a tubular work-performing member closed at one end and open at the other, said member being activatable in a thrust-transmitting direction under joint influence of a pair of cooperable actuatable members, with one of said pair of members being adapted to control the other member, the improvement which comprises: primary and secondary concentrically overlapping fluid supply chambers; a blind axial bore in said work member which opens into a counterbore defining said secondary supply chamber; a reactive piston having a normal position and provided with an outstanding annular flange at its rear end and which slidably projects into said counterbore; an internal annular shoulder defined by the juncture of said blind bore and counterbore; a normally preloaded compression spring encircling that portion of the body portion of said piston coextensive with said secondary supply chamber; a variable dashpot chamber produced by the said piston projecting into said blind bore in normally spaced relation to the blind end thereof; another blind axial bore in said piston defining a cylindrically walled valve chamber closed at its rear end and open at its forward end confronting said dashpot chamber; a valve seat defining the open end of the walled valve chamber; a spring-loaded check-valve normally effective to close the open end of said valve chamber by engagement with said valve seat to isolate the said dashpot chamber from said valve chamber; a port through a portion of the said check-valve for maintaining restrictive fluid communication between said dashpot and valve chambers aforesaid when said check-valve flange is seated whereby initial actuation of said one actuatable member to activate said work member as a unit acts on the fluid in said dashpot chamber to reduce the size thereof thus forcing fluid therefrom through said restrictive port in the check-valve into said valve chamber to provide releasable resistance to movement of said piston relative to said work member and to simultaneously apply thrust thereto; a port through the work member for maintaining fluid communication between said secondary and primary supply chambers; and another normally preloaded spring positioned in said secondary supply chamber to react between said annular flange and shoulder to bias said piston toward normal position upon inactivation of said work member in response to release of said one actuatable member, whereby said check-valve moves against its spring load to connect said valve chamber with the dashpot chamber for rapid refilling of the latter chamber as a function of a partial vacuum obtaining in said dashpot chamber produced during retraction of said piston relative to said work member.

References Cited in the file of this patent
UNITED STATES PATENTS

| 1,887,287 | Churchill | Nov. 8, 1932 |
| 2,112,952 | Casper | Apr. 5, 1938 |
| 2,183,003 | Becker | Dec. 12, 1939 |

FOREIGN PATENTS

| 1,119,575 | France | Apr. 3, 1956 |